United States Patent Office 3,405,762
Patented Oct. 15, 1968

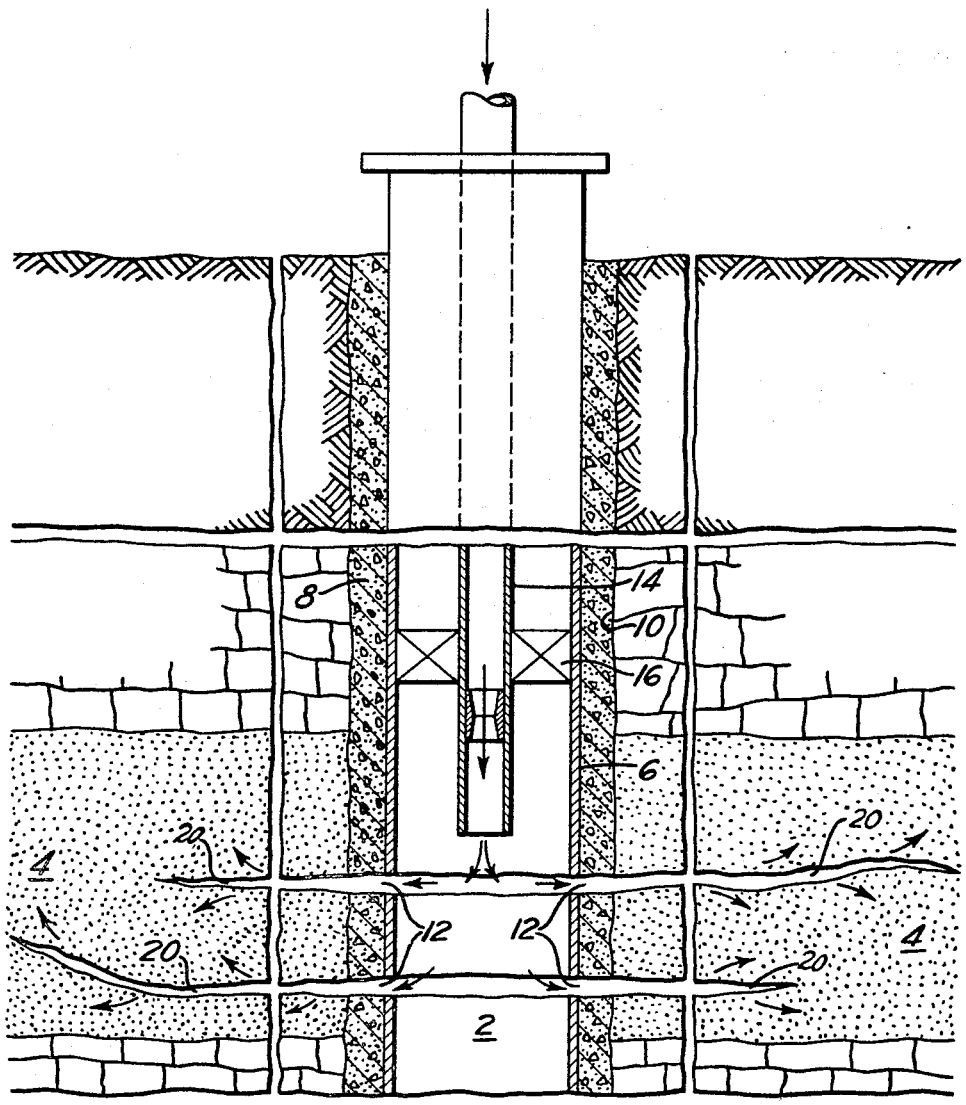

3,405,762
WELL STIMULATION BY SOLVENT INJECTION
Paul L. Terwilliger, Oakmont, Pa., assignor to Gulf Research & Development Company, Pittsburgh, Pa., a corporation of Delaware
Filed July 14, 1966, Ser. No. 565,314
5 Claims. (Cl. 166—42)

ABSTRACT OF THE DISCLOSURE

A method for increasing the production of a viscous oil from a subsurface formation penetrated by a well in which a liquid solvent of low viscosity is injected into the formation at a rate high enough to cause fracturing of the formation. Injection of the solvent is continued to extend the fracture and cause the solvent to move through the formation for a substantial distance from the well. After injection of the solvent the well is shut in for a period of at least a day, and thereafter formation fluids are produced through the well through which the solvent was injected.

---

This invention relates to an improved method of stimulating the production of viscous hydrocarbon fluids from a subterranean formation.

A considerable number of reservoirs presently being produced in the United States are characterized as containing viscous crude. When reservoirs are found to possess heavy viscous fluids the operator is faced with the problem of choosing a well stimulation means which will yield high ultimate recoveries without subjecting the well to adverse conditions.

One method of stimulating the production of heavy viscous crudes is to heat the reservoir. There are disadvantages in using this method to increase the fluidity of a reservoir fluid. Numerous formations and well installations have been seriously damaged while attempting to increase fluidity by this method. Heating techniques are generally expensive and usually require the operation of a considerable amount of treating equipment. Well stimulation by this method also demands close supervision and control by the operator.

Another, less hazardous, method is to inject hydrocarbon-containing gases into the reservoir. This method, although alleviating some of the detrimental effects encountered when heating a reservoir, presents other factors which are adverse to operating efficiency. Gas, when injected into a reservoir, will displace the formation fluids and occupy the deserted pore spaces. During injection and subsequent production, the formation fluids' viscosity will be lowered by their mixing with the injected gas. There is, however, a considerable volume of the injected gas that will be trapped in the pore spaces and become irreducible regardless of the amount of fluid produced after gas injection. The loss of this portion of the valuable injected gas will be a disadvantage to well stimulation. Surface equipment needed for injection gas storage prior to well stimulation is complicated and requires an operator's supervision. Owing to the pressures involved in gas storage, there also exists a potential hazard to life and property.

My invention resides in a method of stimulating production from a hydrocarbon-containing formation by diluting the formation fluids with an injected liquid of lower viscosity. The operation of my invention requires an injection liquid, such as condensate, gasoline or other low viscosity high gravity liquid hydrocarbon, which is soluble in oil. The selected liquid is injected into the well and through the hydrocarbon-containing formation at pressures and rates sufficient to produce fractures. Injection is continued until the injected liquid is moved a desired distance from the well bore. Injection will then be terminated. It is preferred the well shut-in for a minimum of one day to allow injected liquids to further commingle and dilute the formation fluids. This dilution will lower the viscosity of the formation fluids in place and stimulate subsequent production.

The single figure of the drawing is a diagrammatic view, in partial vertical section, of a well in which fractures are being formed by the injection of a solvent in accordance with my invention.

Referring to the drawing, a well bore 2 is shown penetrating a hydrocarbon-containing formation 4 which contains a heavy viscous crude. The well may be completed by setting casing 6 through the hydrocarbon-containing formation 4, as shown in the drawing, or by performing an open hole completion through the producing zone. In either completion method the casing 6 is bonded to the formation by placing a cement sheath 8 in the annulus formed between the wall of the well bore 10 and the casing 6. Where casing 6 is set through the producing zone 4 the hydrocarbon fluids in the formation are provided an access to the well bore 2 through openings 12 produced through the casing 6 and cement sheath 8. These openings 12 are produced by various perforating or notching methods.

Production tubing 14, of smaller diameter than the previously installed casing 6, is run through the casing 6 to a point adjacent the hydrocarbon-containing formation 4. It is preferred in this method that a packer 16 be installed in the annulus between the casing 6 and the production tubing 14 to prevent high injection pressures from damaging the upper portions of the casing 6.

A high gravity low viscosity liquid which is soluble in the formation fluid will be pumped down the production tubing 14, through the openings 12, and into the hydrocarbon-containing formation 4. Injection of the liquid, sometimes hereinafter referred to as solvent, will be maintained at a rate above the regression rate of the formation fluids. The term "regression rate" is used in this application to mean the maximum rate at which formation fluids may be forced to move through the matrix without fracturing the formation matrix. By maintaining such injection rates the hydrocarbon-containing formation 4 will be subjected to pressures which will produce fingers 18 or fractures 20 through the formation 4.

Injection will be continued until the solvent has been extended a desired distance from the well bore 2. Solvent injection will then be terminated and the well will preferably be closed in for at least one day to allow the injected solvent to further mix with the fluids contained in the formation 4.

The formation fluids which have mixed with the injected solvent during the operation of this invention will possess a lower viscosity. The creation of fractures 20 will also operate to establish a less restricted channel of flow from the formation 4 to the well bore 2. The creation of these conditions will thereby operate to stimulate production and enhance the removal of formation fluids located a remote distance from the well bore 2.

The method of well stimulation of my invention requires a high gravity, low viscosity injection liquid. The injection liquid must be soluble in the formation oil and be of such compatible nature that mixing with the formation oil will not produce precipitants. The preferred solvent to be injected generally is a hydrocarbon in the range of $C_4$ to $C_{20}$. Because of their ready availability, natural gasoline or condensate are excellent solvents to be used in this well stimulation method.

This method is adaptable to any reservoir that is capable of being fractured. Although a wide range of formation types may be treated by this method, it has been determined that to realize substantial production benefits the in-place formation fluid should possess a gravity lower than 30° API. Where formation fluids possess a gravity greater than 30° API they are generally sufficiently fluid to allow adequate natural transportation through the matrix.

The maximum amount of solvent to be injected is a function of the expected ultimate recoveries from the reservoir and is a determination to be made by the operator. We prefer, however, that for adequate treatment of reservoir fluids a minimum of 500 barrels of solvent should be injected into the formation. At least 500 barrels are necessary to achieve adequate mixing a substantial distance into the reservoir.

Owing to the flow characteristics of solvents used in this invention, it has been found that injection rates should be maintained within a range of from two times the regression rate of the oil to 1000 times the regression rate. Injection rates below this minimum will not produce adequate fractures or fingers through the formation but will allow the formation fluids to be uniformly moved away from the well bore. The preferred injection rate, however, is from two times the regression rate of the oil to 500 times the regression rate.

After injection of the solvent into the formation at rates sufficient to create fractures or fingers through the formation to desired radial distances from the well, injection will preferably be terminated for at least one day before production from the well is commenced. This preferred closed in period has been deemed the time necessary for injected solvents to dissipate through the formation and further mix with the in-place reservoir fluids. Should production operations be initiated prior to this 24 hour dissipation period, an excess of solvent will be recovered thereby rendering it unavailable for further mixing during production. Such premature production will thus lower the efficiency of the operation and decrease expected recoveries. Overflushing the fractures with a water or other liquid slug is another method of preventing excessive recoveries of solvent during first production after treatment by this invention.

Although this well stimulation method will function over an extended period of time, crude oil recoveries will eventually decrease to a rate which dictates the reapplication of this treatment. The operator may then retreat the well by this method and expect satisfactory results. It is usually advisable however to increase the volume of solvent injected with each subsequent treatment. Increasing the volume of solvent will extend the treatment area to greater radial depths thereby treating additional undisturbed hydrocarbon deposits.

Increasing the fluidity of formation fluids by this method foregoes the detrimental effects encountered when attempts are made to increase fluidity by heating the formation or by injecting a hydrocarbon gas. The heating of a formation to lower the viscosity of formation fluids is very expensive and unless close supervision is given the heating operation, the well equipment may be seriously damaged. Where hydrocarbon gases are injected to lower the viscosity of formation fluids, property and personnel may be endangered by a malfunction of the high pressure equipment. The irreducible gas which is trapped in the pore spaces will not only increase the cost of the stimulation process but will also operate to restrict the flow of formation fluids through the matrix.

The utilization of solvent as a dilution material in my invention thereby decrease the treatment expenditure and functions to achieve a more efficient dilution. Accomplishing a more efficient treatment without subjecting the well to the possible dangers encountered in the utilization of other methods are factors which dictate my method to be an improved well stimulation technique.

An example of the performance of my invention may be offered by reviewing experimental test data gathered from a commercially produced oil well. The natural production from this well, before stimulation by my invention, was four barrels of 14° API gravity oil per day. The hydrocarbon-containing formation from which this viscous oil was produced possessed a thickness of only ten feet, a bottom hole breakdown pressure of 3100 p.s.i. and a permeability of 1.5 darcies. The viscosity of the produced crude was 1000 centipoise at a reservoir temperature of 76° F.

1500 barrels of 70° API 26 pound vapor pressure condensate were injected, at atmospheric temperature, into the formation at pressures and rates sufficiently larger to create fractures and fingers through the formation. Pressure fall off tests made in conjunction with condensate injection rates indicated that the condensate was fracturing and fingering into less than six inches of the ten foot pay section.

After successfully injecting the condensate into the formation, in accordance with my invention, subsequently produced fluids from the reservoir were analyzed to determine whether or not the fluids in the reservoir had undergone a significant amount of mixing. Samples of the produced fluids were periodically gathered and measurements were conducted by three different methods; API gravity, viscosity and by distilling a sample of the produced fluid. The results of these tests indicated that substantial formation mixing had occurred, the fluidity of the reservoir had markedly increased and owing to the high recovery of the condensate for reuse, the method was most economical.

During the 44 days of testing, the well produced 1083 barrels of crude and recovered 941 barrels of the condensate. This represented a test period recovery of 907 barrels of crude which would not have been produced had this well stimulation technique been ineffective. Upon the termination of testing there remained in the reservoir and available for further dilution, over one-third of the solvent originally injected.

In wells which possess low production rates and expected ultimate recoveries, stimulation by the solvent injection method of this invention is advisable. This method of well stimulation is also readily adaptable and advantageous in thin formations, small reservoirs and where early breakthrough of a flood would be anticipated.

Well stimulation in accordance with my invention will therefore effectively increase production while avoiding the adverse conditions created by other methods heretofore employed.

Therefore I claim:

1. A method of recovering viscous oil from subsurface oil-bearing formations capable of being fractured and penetrated by a well bore comprising injecting down the well and into the formation a liquid soluble in the formation oil and having a viscosity lower than the viscosity of the formation oil at a rate 2 to 500 times the regression rate of formation fluids in the formation to create fractures in the formation and displace the liquid therethrough, terminating injection of the liquid, holding the injected liquid in the formation for a period of at least one day to mix the liquid with formation oil, and subsequently producing fluids from the formation through the well bore.

2. A method as set forth in claim 1 in which the oil in the formation has a gravity lower than 30° API and the injected liquid includes hydrocarbons having 4 to 20 carbon atoms per molecule.

3. A method as set forth in claim 2 in which the injection of the liquid is continued to move the liquid through the formation a distance of at least 100 feet from the well.

4. A method as set forth in claim 2 in which water is injected into the formation following the injection of the liquid soluble in the formation oil.

5. A method as set forth in claim 1 in which the oil has a gravity lower than 30° API and the injected liquid is natural gasoline.

References Cited

UNITED STATES PATENTS

| | | | |
|---|---|---|---|
| 3,252,512 | 5/1966 | Baker et al. | 166—2 |
| 3,266,569 | 8/1966 | Sterrett | 166—2 |
| 3,285,336 | 11/1966 | Gardner | 166—11 |
| 3,330,353 | 7/1967 | Flohr | 166—2 X |
| 3,333,637 | 8/1967 | Prats | 166—2 X |

STEPHEN J. NOVOSAD, *Primary Examiner.*